Figure 4:
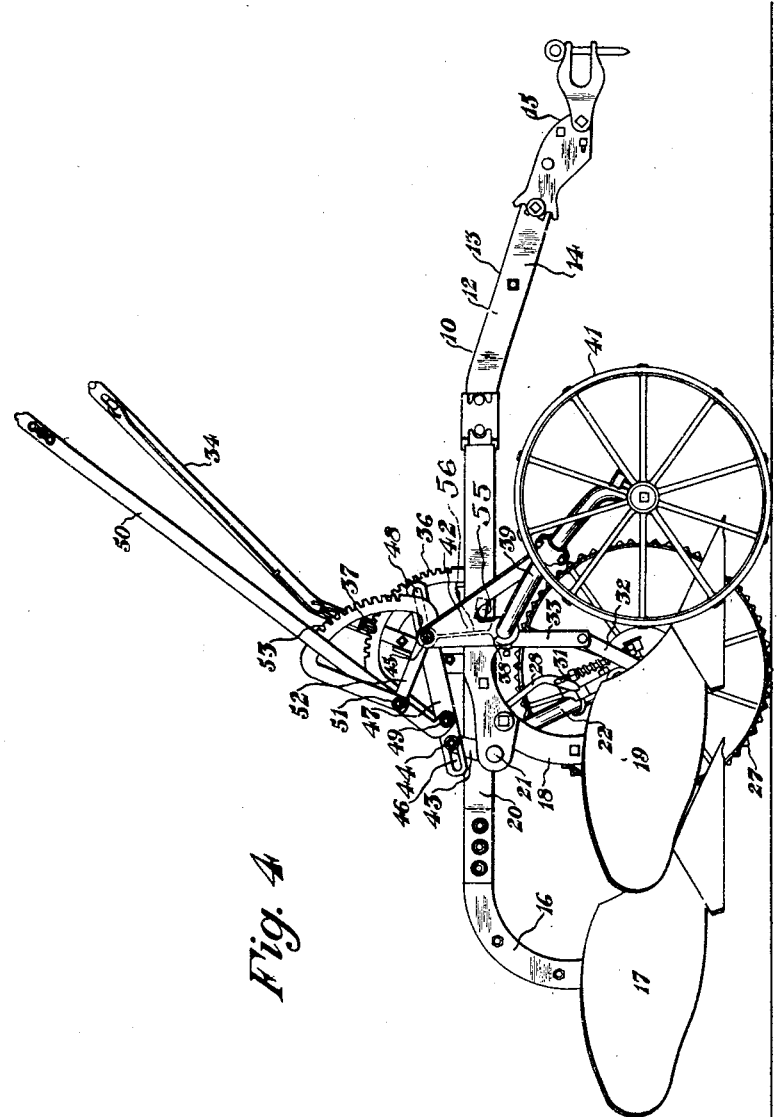

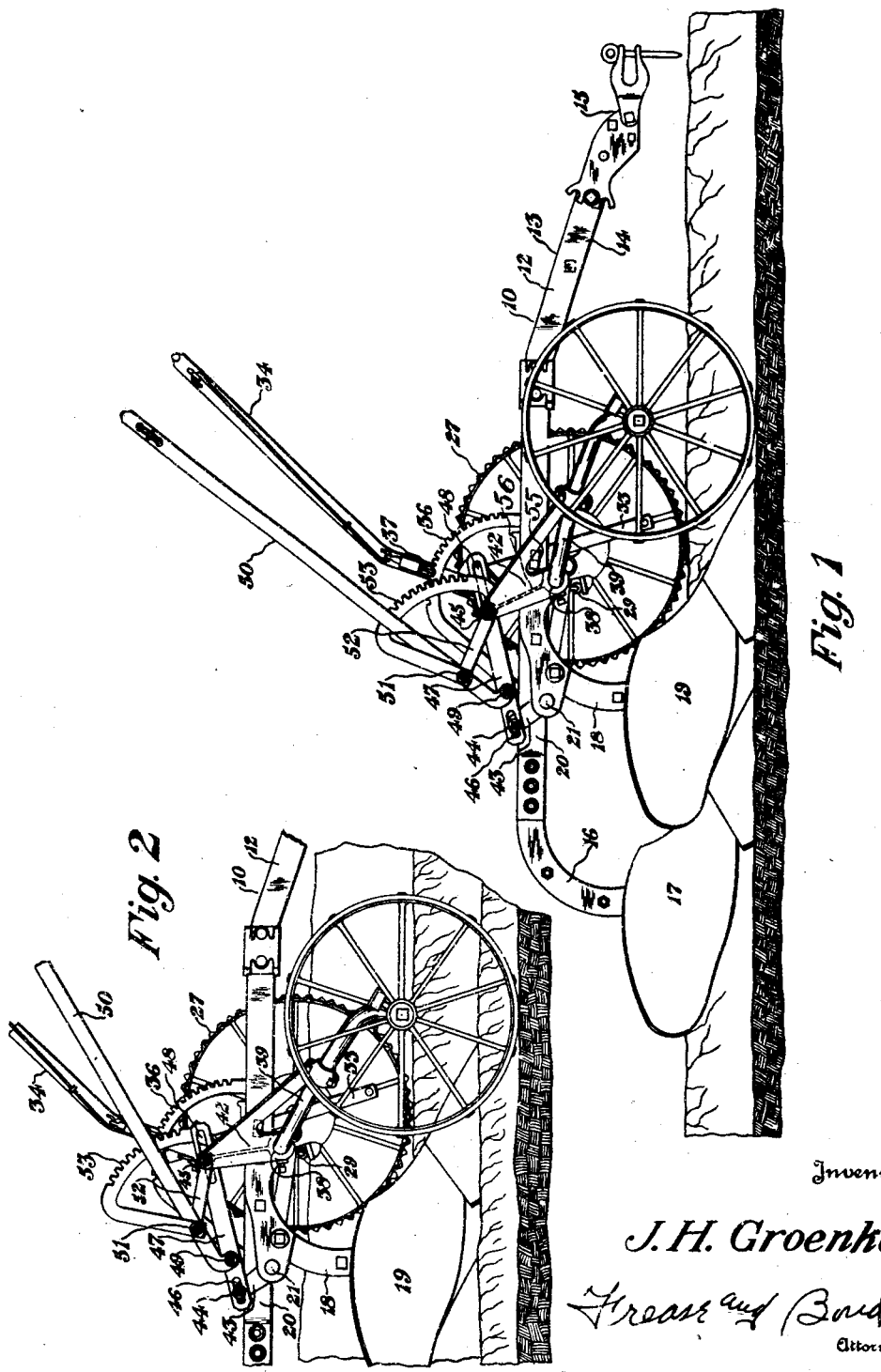

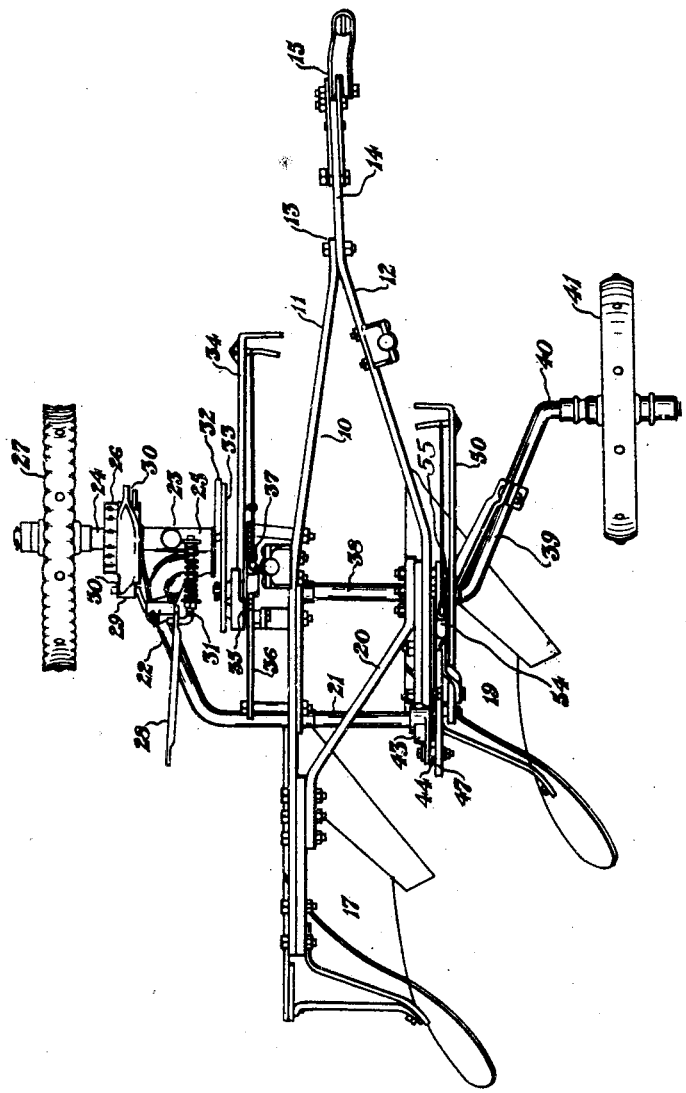

Patented Sept. 25, 1928.

1,685,321

UNITED STATES PATENT OFFICE.

JOHN H. GROENKE, OF CANTON, OHIO, ASSIGNOR TO THE BUCHER & GIBBS PLOW COMPANY, OF CANTON, OHIO, A CORPORATION OF OHIO.

SELF-LEVELING WHEELED PLOW.

Application filed August 22, 1927. Serial No. 214,585.

My invention relates to wheeled plows, usually tractor driven, including a frame, one or more plows depending from the frame, and a land wheel and a furrow wheel each journalled at the lower end of a crank axle, the upper shaft end of which is mounted for oscillation on the frame, and there preferably being a power lift mechanism associated with the land wheel and its crank axle, and link means connecting the crank axles with each other, whereby adjusting and leveling of the plows may be attained, and whereby a power lift applied to the land wheel crank axle will be transmitted to the furrow wheel, and the frame and plows will be elevated for transporting.

More particularly my present invention relates to improvements in the link means connecting the crank axles.

Link or other means not including my present improvements have been used heretofore to connect crank axles of plows of the foregoing description, but such connecting means have not permitted independent angular adjustment at all times of either crank axle; and it has been necessary in plowing over uneven ground, for the operator, usually the tractor driver, to vary the position of the furrow wheel with respect to the frame by manipulation of the adjusting lever associated therewith, with a consequent change in the position of the land wheel, whereby a furrow of uneven depth is made.

Accordingly the objects of the present improvements are to provide link means connecting the crank axles which permit independent adjustment at all times of the crank axles, and which permit, while plowing, slight vertical oscillations of the furrow wheel without disturbing the adjustment of the land wheel.

Further objects of the improvements include the provision of simplified, economically made, and conveniently operated self-leveling plows.

These and ancillary objects are attained by a construction and arrangement hereinafter set forth in detail and which may be stated in general terms as including a frame, one or more plows depending from the frame, a land wheel and a furrow wheel each journalled at the lower end of a crank axle, the upper shaft end of each axle being mounted for oscillation on the frame, a power lift mechanism associated with the land wheel, its crank axle, and the frame, and means connecting the crank axles with each other including a crank arm on the upper shaft end of each axle, a rigid link having a slot and pin connection at one end with one of the crank arms and at the other end with the other crank arm, a lever pivoted on the link, a connecting bar pivotally connected at one of its ends with the lever and at its other end with one of the crank arms, and means preferably a notched segment rigidly mounted on the connecting bar and concentric with its pivotal connection with the lever and cooperating with a latch on the lever for varying and securing the angular relationship between the link, the lever, and the bar.

A preferred embodiment of the invention is illustrated in the accompanying drawings forming part hereof, in which Figure 1 is a land side elevation of the improved plow adjusted for plowing on substantially level ground;

Fig. 2, a fragmentary land side elevation similar to Fig. 1 illustrating the plow adjusted for hill-side plowing;

Fig. 3, a plan view thereof; and

Fig. 4, a land side elevation of the improved plow adjusted for transportation.

Similar numerals refer to similar parts throughout the drawings.

The improved plow is provided with a frame indicated generally at 10, and including a land side beam 11 and a furrow side beam 12 converging at their forward ends and connected with each other as at 13, a forward extension 14 of the beam 12 being downwardly angled and provided at its forward end with coupling means 15 for connecting the plow with draft means not shown, such as a tractor. The beams 11 and 12 are bent to be laterally spaced from and parallel with each other at the rear of their forward connection at 13; and the beam 11 extends rearwardly beyond the rear end of the beam 12.

The rear end of the beam 11 is connected with a forwardly curving plow standard 16 carrying at its lower end a plow 17; and the rear end of the beam 12 is connected with a forwardly curving plow standard 18 carrying at its lower end a plow 19.

An angled beam strut 20 may connect and space the parallel portions of the beams 11 and 12.

An upper laterally extending shaft end 21 of a land wheel crank axle 22 is journalled for oscillation in suitable bearings depending from the frame 10; and the crank axle 22 extends outwardly and downwardly from the frame 10, and is provided at its lower end with a power lift mechanism indicated generally at 23 and including a laterally extending stub shaft 24 journalled at its inner end in a suitable bracket 25 rigidly mounted at the lower end of the crank axle 22, and provided at its outer end with a clutch mounting 26 which carries for rotation a land wheel 27.

The clutch mounting 26 is provided with a control lever 28 mounted for oscillation on the bracket 25, and the lever 28 is provided with a laterally extending roller 29 adapted for consecutive oscillation into and out of one of a pair of oppositely spaced U notches 30 in the clutch mounting 26; whereby when the roller 29, is engaged in either of the U notches, the clutch is inoperative, the roller 29 being normally maintained in one of the notches 30 as by means of a spring pressed rod 31.

When the roller 29 is withdrawn from one of the notches 30, the wheel 27 is clutch connected with the stub shaft 24, rotating the same a half revolution until the roller 29 is engaged with the opposite U notch, thereby breaking the clutch connection between the land wheel 27 and the stub shaft 24.

The stub shaft 24 is provided at its inner end with an elevating crank arm 32, the outer end of which is pivotally connected with one end of an elevating link 33, the other end of which is pivotally connected with a land wheel adjusting lever 34 whose lower end is pivoted at 35 upon a suitable bracket mounted on the frame 10. A segment 36 is mounted upon the frame 10 concentric with the land wheel adjusting lever pivot 35, and a latch 37 on the adjusting lever permits the same to be secured in any desired angular relationship with the frame, thereby determining the angular relationship of the crank axle 22 and the relative elevation of the wheel 27 with respect to the frame.

Longitudinally spaced forward of the land wheel axle shaft end 21, an upper laterally extending shaft end 38 of a furrow wheel crank axle 39 is journalled for oscillation in suitable bearings depending from the frame 10; and the crank axle 39 extends outwardly and downwardly from the frame 10, and terminates at its lower end in a furrow wheel spindle 40 upon which a furrow wheel 41 is journalled.

An upwardly extending crank arm 42 is rigidly mounted on the shaft end 38 for oscillation therewith; and a crank arm 43 preferably shorter than the arm 42, is rigidly mounted on the shaft end 21 for oscillation therewith.

An outwardly extending pin 44 is mounted at the outer end of the crank arm 43; and an inwardly extending pin 45 is mounted at the outer end of the crank arm 42; and the pin 44 slidably extends through a slot 46 in the rear end of a rigid connecting link 47, and there being a slot 48 at the forward end of the link 47 through which the pin 45 slidably extends.

A pivot pin 49 is rigidly mounted on the link 47 preferably between the slots in the ends thereof, and a furrow wheel adjusting lever 50 is mounted for oscillation on the pin 49.

A pin 51 on the lever 50 pivotally secures one end of a connecting bar 52, the other end of which is pivotally mounted on the pin 45. A notched segment 53 concentric with the pin 51 is rigidly mounted on the connecting bar 52 and cooperates with a latch 54 on the lever 50 for varying and securing the angular relationship between the lever 50, the bar 52, and the link 47.

As illustrated in Fig. 1, the plow is adjusted for plowing, the elevating crank arm 32 of the clutch mounting 26 being directed downward, and the roller 29 being engaged in one of the U notches 30, thereby breaking the clutch connection between the land wheel 27 and the elevating crank arm 32. In this position of the crank arm 32, oscillating the land wheel adjusting lever 34 towards the rear raises the land wheel 27, but by reason of the slot 46 in the link 47 the land wheel 27 may be raised or lowered a certain distance, depending on the length of the slot 46, without changing the adjustment of the furrow wheel 41.

The depth of the plowed furrow is dependent upon the relative elevations of the land wheel 27 and the bottoms of the plows 17 and 19, and for plowing on the level there is no necessity for the furrow wheel 41 to rigidly support its side of the frame.

Consequently the furrow wheel adjusting lever 50 is fixed in such position as indicated in Fig. 1 that the distance between the pins 45 and 49 approximate the minimum possible, and the pin 44 under normal plowing condition lies longitudinally midway of its slot 46, whereby the furrow wheel 41 is permitted relatively slight upward and downward movements as may be caused by holes at the bottom of the furrow or unevenness of the ground, without interfering with the adjustment of the land wheel 27.

The function of any link means between the land wheel axle crank arm 43 and the furrow wheel axle crank arm 42 is to transmit the power lift derived from the land wheel 29, when the power lift mechanism is functioning, to the furrow wheel crank axle 39 whereby the furrow wheel crank axle will elevate and support its share of the plow load when the plows are elevated at the end of a furrow or for transporting as indicated in Fig. 4.

At the end of a furrow, the roller 29 is withdrawn from engagement with the notch 30 with which it has been engaged during the plowing operation, thereby causing the clutch to connect the land wheel 27 with the stub shaft 24, rotating the same a half revolution and rotating therewith to extend upwardly as indicated in Fig. 4, the elevating crank arm 32, with a consequent oscillation of the land wheel axle crank arm 43 forward to abut the pin 44 against the forward end of the slot 46 thereby transmitting the forward motion of the crank arm to the rigidly adjusted link 47, lever 50 and bar 52, and to the furrow wheel axle crank arm 42 whereby the furrow wheel crank axle 39 is caused to elevate its portion of the frame and plow load.

The plows may then be lowered into plowing position, by again withdrawing the roller 29 from the notch 30 with which it is then engaged, and permitting another substantially half revolution of the crank arm 32 back to the position illustrated in Fig. 1.

By the construction and arrangement for the wheeled plow as aforesaid, including a slot and pin connection between each crank arm 42 and 43 and the connecting link 47 therefor, the elevation of either the land wheel or the furrow wheel may be varied with respect to the frame within a certain degree independent of the elevation of the other, and the furrow wheel is permitted to rise and fall over any unevenness of the ground at the bottom of the furrow without disturbing the relative adjustment of the land wheel, and at the same time this improved link connection permits the furrow wheel to function properly with the land wheel when the same is operated for power-lifting the frame and plows as aforesaid.

It is obvious that other agricultural implements may be substituted for the plows illustrated herein as depending from the frame 10 without in any way affecting the operation of the apparatus as hereinbefore set forth.

Fig. 2 illustrates the relative positions of the furrow wheel adjusting lever 50, the link 47 and the bar 52, when the distance between the pins 45 and 49 has been increased by oscillating the furrow wheel adjusting lever downward, with a consequent oscillation of the furrow wheel downward.

As is clearly illustrated in Fig. 2, this adjustment of the furrow wheel for hill-side plowing is made entirely independent of the adjustment of the land side wheel.

For preventing the furrow wheel axle crank arm 42 from oscillating too far forward when the plows are elevated, a stop 55 extends laterally outward from the beam 12 for abutment with an inwardly extending web 56 on the arm 42, whereby the furrow wheel 41 is always maintained forward of the vertical plane passing through the axis of the shaft 38 of the furrow wheel crank axle 39, whereby the furrow wheel and the crank axle are always in position to permit the proper functioning of the mechanism as hereinbefore described.

I claim:

1. An agricultural implement including a frame, a pair of crank axles each mounted at its upper shaft end for oscillation on the frame, a land wheel journalled at the lower end of one of the crank axles, a furrow wheel journalled at the lower end of the other crank axle, a crank arm rigidly mounted on the upper shaft end of each axle, a rigid link having a slot and pin connection at one of its ends with one of the crank arms and at its other end with the other crank arm, a lever pivotally mounted on the link, a connecting bar pivotally connected at one of its ends with the lever and at its other end with one of the crank arms, and means for selectively varying and securing the angular relationship between the link, the lever, and the bar.

2. An agricultural implement including a frame, a pair of crank axles each mounted at its upper shaft end for oscillation on the frame, a land wheel journalled at the lower end of one of the crank axles, a furrow wheel journalled at the lower end of the other crank axle, a crank arm rigidly mounted on the upper shaft end of each axle, a rigid link having a slot and pin connection at one of its ends with one of the crank arms and at its other end with the other crank arm, a lever pivotally mounted on the link between the crank arms, a connecting bar pivotally connected at one of its ends with the lever and at its other end with one of the crank arms, and means for selectively varying and securing the angular relationship between the link, the lever, and the bar.

3. An agricultural implement including a frame, a pair of crank axles each mounted at its upper shaft end for oscillation on the frame, a land wheel journalled at the lower end of one of the crank axles, a furrow wheel journalled at the lower end of the other crank axle, a crank arm rigidly mounted on the upper shaft end of each axle, a rigid link having a slot and pin connection at one of its ends with one of the crank arms and at its other end with the other crank arm, a lever pivotally mounted on the link, a connecting bar pivotally connected at one of its ends with the lever and at the other end with the furrow wheel axle crank arm, and means for selectively varying and securing the angular relationship between the link, the lever, and the bar.

4. An agricultural implement including a frame, a pair of crank axles each mounted at its upper shaft end for oscillation on the frame, a land wheel journalled at the lower end of one of the crank axles, a furrow wheel journalled at the lower end of the other crank axle, a crank arm rigidly mounted on the upper shaft end of each axle, a rigid link having a slot and pin connection at one of its ends with one of the crank arms and at its other end with the other crank arm, a lever pivotally mounted on the link, a connecting bar pivotally connected at one of its ends with the lever and at its other end with one of the crank arms, means for selectively varying and securing the angular relationship between the link, the lever, and the bar, and a stop on the frame for limiting oscillation in one direction of one of the crank arms.

5. An agricultural implement including a frame, a pair of crank axles each mounted at its upper shaft end for oscillation on the frame, a power lift mechanism and a land wheel mounted at the lower end of one of the crank axles, a furrow wheel journalled at the lower end of the other crank axle, a crank arm rigidly mounted on the upper shaft end of each axle, a rigid link having a slot and pin connection at one of its ends with one of the crank arms and at its other end with the other crank arm, a lever pivotally mounted on the link, a connecting bar pivotally connected at one of its ends with the lever and at its other end with the furrow wheel axle crank arm, means for selectively varying and securing the angular relationship between the link, the lever, and the bar, and a stop on the frame for limiting oscillation in one direction of the furrow wheel axle crank arm.

In testimony that I claim the above I have hereunto subscribed my name.

JOHN H. GROENKE.